United States Patent
Oberly et al.

[15] 3,663,313
[45] May 16, 1972

[54] WELDING FLUX COMPOSITION

[72] Inventors: James E. Oberly, Kearny; Thomas L. Coless, Maplewood; K. Woodrow Rimer, Plainfield, all of N.J.

[73] Assignee: Union Carbide Corporation, New York, N.Y.

[22] Filed: June 15, 1970

[21] Appl. No.: 46,529

[52] U.S. Cl....................................148/23, 148/24, 148/26, 219/73
[51] Int. Cl.............................................B23k 35/38
[58] Field of Search..........................148/24, 26, 23; 219/73

[56] References Cited

UNITED STATES PATENTS

| | | |
|---|---|---|
| 3,328,212 | 6/1967 | Coless........................................148/26 |
| 3,551,217 | 12/1970 | Coless........................................148/26 |
| 3,480,487 | 11/1969 | Coless et al................................148/26 |
| 2,814,579 | 11/1957 | Stringham et al..........................148/26 |
| 2,895,863 | 7/1959 | Stringham et al..........................148/26 |
| 3,340,107 | 9/1967 | Ballass et al..............................148/26 |

Primary Examiner—L. Dewayne Rutledge
Assistant Examiner—G. T. Ozaki
Attorney—Harrie M. Humphreys and Dominic J. Terminello

[57] ABSTRACT

A bonded welding composition or flux for welding or surfacing of metals which is free-peeling, essentially non-hygroscopic. The composition contains calcium carbonate as its major ingredient together with a sodium or potassium silicate binder. The flux is rendered non-hygroscopic by heating the ingredients to a temperature in the range of 1,450° F. to about 1,800° F.

2 Claims, No Drawings

WELDING FLUX COMPOSITION

This invention relates to welding compositions or fluxes of the bonded type; more particularly, this invention relates to a bonded welding flux for welding stainless steel or surfacing low alloy steels with stainless steel by the submerged arc process.

Submerged arc welding fluxes are generally referred to as fused fluxes or bonded fluxes. Bonded fluxes are characterized by the use of a bonding agent usually sodium or potassium silicate to form granular composites of finely ground flux ingredients. The granules or pellets are then heated to remove moisture and gaseous products. Usually, the bonded ingredients are heated from a minimum temperature of 600° F. to a maximum temperature of about 2,000° F.

There has been a need in the art for a bonded submerged arc flux that is more suitable for stainless steel welding or surfacing low alloying steels with stainless steel. In order for a flux to be useful for stainless steel applications, the flux should be able to transfer metals from the electrode through the flux to the weld deposit, and produce a slag which is easily removed from the weld. The weld deposit must be of good contour, sound and free from defects.

Accordingly, it is the main object of this invention to provide a flux for welding or surfacing which permits good transfer of the chemical composition of the welding electrode to the weld.

Another object is to provide a submerged arc flux for the welding of stainless steel alloys or surfacing low alloy steels with an alloy of stainless steel.

A further object is to provide an essentially non-hygroscopic bonded submerged arc flux for welding and/or surfacing.

Still another object is to provide a bonded submerged arc flux which produces an essentially free-peeling slag.

In its broadest aspects, the invention resides in a bonded submerged arc flux composition produced essentially from about 30 to about 60 weight percent calcium carbonate ($CaCO_3$); about 20 to about 40 weight percent zircon sand ($ZrSiO_4$); about 4 weight percent to about 20 weight percent cryolite ($Na_3AlF_6$) and at least one silicate taken from the class of silicates consisting of potassium and sodium silicates present in the amount of from about 4 to about 10 dry weight percent.

Bonded fluxes have contained $CaCO_3$ in small quantities. However, up until now large quantities such as 30 to 60 weight percent have not been used. Calcium carbonate, in large quantities, up until now was generally considered unusable in submerged arc welding fluxes. If considerable $CaCO_3$ is present in the flux, $CO_2$ gas remains available to be released in the heat of the arc thereby causing distortion of the weld and poor weld quality, i.e., porosity. If in the manufacture of the flux the constituents are heated above about 1,517° F., the $CaCO_3$ decomposes into CaO and gaseous $CO_2$. The CaO remaining in the flux is hygroscopic and will pick up water which is harmful to the weld.

On the other hand, CaO is a desirable ingredient in submerged arc fluxes for welding or surfacing metals such as stainless steel because CaO is nonreactive with constituents of stainless steel. Thus, if CaO could be rendered nonhygroscopic, $CaCO_3$ would be a desirable flux ingredient especially for welding or surfacing of stainless steel alloys.

It has been unexpectedly found that high quantities of $CaCO_3$, when bonded with a silicate such as sodium or potassium and heated to between about 1,450° F. and 1,800° F., a non-hygroscopic flux will form. Sodium and potassium silicates are commonly used as binders for submerged arc flux ingredients. They are available in various ratios of alkali to silica in both powdered and liquid forms. They are considered soluble glasses which do not exhibit a sharp melting point. Depending on their composition or alkali to silica ratio they begin to soften at approximately 1,150° F. and become completely molten between 1,400° F. and 1,550° F. It is theorized therefore that when the flux mixture is heated to temperatures of between 1,450° F. and 1,800° F., $CaCO_3$ converts to CaO and becomes saturated and coated with silicate. The flux which includes CaO is then impervious to water absorption after cooling.

This discovery was used in the development of a flux system comprising 30 to 60 weight percent $CaCO_3$ for surfacing low alloy steels with stainless steel. Such flux system also includes zircon sand and cryolite as additional slag forming ingredients in order to produce a flux system having all the desired properties for surfacing low alloy steels with stainless steel. Such properties include free peeling slag and good transfer of the chemical composition of the welding electrode to the weld puddle.

It was found, for example, that a preferred flux containing 48 weight percent $CaCO_3$; 27 weight percent $ZrSiO_4$; 10 weight percent $Na_3AlF_6$; 6 weight percent sodium silicate; 1 weight percent potassium silicate 4 weight percent $SiO_2$; and 2 weight percent each of ferrochrome and ferrosilicon produced stainless steel weld beads on low alloy steel that were porosity-free with good contour. The slag removed easily from the weld and there was essentially no loss of alloying ingredients. For purposes of this disclosure and the claims appended hereto the flux composition is defined in terms of starting ingredients.

The following Table gives examples of various other flux compositions in weight percent which have been found to be desirable for welding and surfacing of stainless steel and other metals.

|  | A | B | C | D |
|---|---|---|---|---|
| $CaCO_3$ | 35 | 55 | 40 | 50 |
| $ZrSiO_4$ | 40 | 20 | 24 | 25 |
| $Na_3AlF_6$ | 5 | 4 | 10 | 14 |
| Sodium Silicate | 8 | 4 | 6 | 8 |
| Potassium Silicate | — | 4 | — | 2 |
| MgO | 10 | — | 20 | — |
| FeSi | 2 | 2 | — | — |
| FeCr | — | 3 | — | 1 |
| $SiO_2$ | — | 8 | — | — |

As will be noted from the above table, other ingredients such as MgO may be used in conjunction with the slag forming ingredients to produce desired flux systems according to the teaching of this invention.

Likewise, other fluorides may be used as a substitute for or in conjunction with $Na_3AlF_6$. For example, $CaF_2$, LiF, NaF, $MgF_2$, $AlF_3$, KF may be used.

The metals, their alloys, or their ferroalloys, such as SiMn, FeSi and FeCr, can be added as desired for deoxidizing purposes or for alloying to adjust the weld chemistry. For example, other metals are Nickel, Columbium, Molybdenum, Manganese, Titanium, Calcium, Vanadium, Cobalt and Aluminum.

The composition of the present invention is made by sizing the raw materials, as desired. The sized materials are dry blended thoroughly. The potassium and sodium silicates in liquid form are added to form granules. The mixture is passed through a rotating kiln where it is heated to a temperature between 1,450° F. and 1,800° F. At these temperatures, the $CaCO_3$ converts to CaO and gaseous $CO_2$. The CaO is saturated and coated by the liquefied and molten silicate binders. Upon cooling, the CaO is coated with silicate and is impervious to moisture absorption.

After processing according to the above procedure, the preferred flux composition given above had the following analysis: CaO 32 wt.%; $CO_2$ 1.0 wt.%; $ZrSiO_4$ 35 wt.%; $SiO_2$ 5.5 wt.%; $Na_3AlF_6$ 12 wt.%; $Na_2O:SiO_2$ 7.5 wt.%; $K_2O:SiO_2$ 1.5 wt.%; FeCr 3 wt.%; FeSi 2.5 wt.%.

The following are typical weld performance examples using the composition of the invention.

EXAMPLE I

A 2 inch thick low alloy steel plate was surfaced with ASTM type 309L stainless steel wire using AC power and the submerged series arc process defined in U.S. Pat. No. 2,669,640 issued to F. G. Outcalt. The welding conditions were as follows: two 5/32 inch diameter 309L wires were connected in a series AC circuit. The composition was produced from the following materials: 48 wt.% $CaCO_3$; 27 wt.% $ZrSiO_4$; 10 wt.% $Na_3AlF_6$; 6 wt.% $Na_2O:SiO_2$; 1 wt.% $K_2O:SiO_2$; 4 wt.% $SiO_2$ and 2 wt.% each of FeCr and FeSi. Multiple beads were deposited side by side to produce a single layer. Each bead was made with 30 volts in each wire with 450 amperes and a travel speed of 15 ipm. The resulting beads had a uniform low penetration pattern. The fused slag was free-peeling. Bend tests taken from the weld beads were free from fissures and cracks indicating a sound deposit. Chemical analysis of the weld beads showed nominally 20 wt.% chromium; 10 wt.% nickel; and 0.05 wt.% carbon which meets the chemical specification for the application.

EXAMPLE II

Two and one-half inch thick ASTM 304 stainless steel plates were welded using the submerged arc process. The welding electrode was ASTM 308 stainless steel, 1/8 Dia. The chemical analysis weight percent of the electrode was as follows:

| | |
|---|---|
| Cr | 20.99 |
| Ni | 9.80 |
| Si | 0.45 |
| Mn | 1.83 |
| C | 0.054 |
| Mo | 0.21 Balance iron |

Flux D from the Table was used. The welding conditions were 450 Amps AC., 30 volts, 14 ipm travel speed. A multipass welding technique was used The fused slag was easily removed after each pass. The weld was sound, crack-free and met all the mechanical property requirements. The chemical analysis of the deposit was as follows.

| | |
|---|---|
| Cr | 21.48 |
| Ni | 9.40 |
| Si | 0.56 |
| Mn | 1.15 |
| C | 0.061 |
| Mo | 0.23 Balance iron |

What is claimed is:

1. A granular arc bonded welding composition consisting essentially of about 30 to 60 weight percent $CaCO_3$; about 20 to 40 weight percent $ZrSiO_4$; about 4 to 20 weight percent $Na_3AlF_6$ and at least one silicate taken from the class of silicates consisting of potassium and sodium silicates present in the amount of from about 4 to 10 dry weight percent.

2. A granular submerged arc bonded welding composition consisting essentially of:

| | |
|---|---|
| 48 weight per cent | $CaCO_3$ |
| 27 weight per cent | $ZrSiO_4$ |
| 10 weight per cent | $Na_3AlF_6$ |
| 6 weight per cent | Sodium Silicate |
| 1 weight per cent | Potassium Silicate |
| 4 weight per cent | $SiO_2$ |
| 2 weight per cent | FeCr |
| 2 weight per cent | FeSi |

* * * * *